3,639,626
SUPPRESSING THE ACTIVITY OF PLASMIN IN HUMANS AND ANIMALS WITH TRANS-4-(AMINOMETHYL)-CYCLOHEXANE - 1 - CARBOXYLIC ACID

Fujio Nagasawa, Shosuke Okamoto, Eiichi Takagi, Mikio Yokoi, and Mitsuo Mangyo, Tokyo, Japan, assignors to Mitsubishi Chemical Industries Limited, Tokyo, Japan No Drawing. Continuation of application Ser. No. 388,016, Aug. 6, 1964, which is a continuation-in-part of application Ser. No. 108,245, May 8, 1961, now Patent No. 3,268,405, dated Aug. 23, 1966. This application Aug. 25, 1967, Ser. No. 663,447

The portion of the term of the patent subsequent to Aug. 23, 1983, has been disclaimed Int. Cl. A01n 9/20; A61k 15/12

U.S. Cl. 424—319            6 Claims

ABSTRACT OF THE DISCLOSURE

A method of suppressing the activity of plasmin in vivo comprising introducing an effective amount of trans-4-(aminomethyl)-cyclohexane-1-carboxylic acid into the living body of humans and animals; said trans-acid having the melting point of 380–390° C. (decomposed), the characteristic infra-red absorptions at 1637, 1535 and 1383 cm.$^{-1}$ and the following conformation:

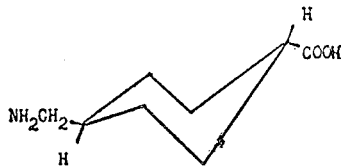

and the melting point of the hydrochloric acid salt thereof [$C_8H_{15}NO_2 \cdot HCl$], the gold salt thereof $$[C_8H_{15}NO_2 \cdot HCl \cdot AuCl_3]$$

and the platinum salt thereof [$(C_8H_{15}NO_2 \cdot HCl)_2PtCl_4$] being 238–240° C. (decomposed), 204–206° C. (decomposed) and 254–255° C.

---

This application is a streamlined continuation of co-pending application Ser. No. 388,016, filed Aug. 6, 1964, now abandoned, which in turn was a continuation-in-part application of co-pending application Ser. No. 108,245, filed May 8, 1961, now issued as Pat. No. 3,268,405, dated Aug. 23, 1966.

This invention relates to a new useful drug composition for inhibiting the activation of plasmin and/or activity of plasmin in vitro and in vivo; more particularly, this invention relates to the new composition in which 4-(aminomethyl)-cyclohexane-1-carboxylic acid, especially the trans stereo isomer thereof, is used as an active ingredient having a potent inhibitory action on the plasmin system and also an excellent therapeutic effect on disorders associated with and/or caused by the activated plasmin in vivo, without any accompanying noticable toxicity when applied.

In U.S. Pat. 2,939,817, British Pat. 770,693 and Canadian Pat. 593,482, we proposed that ε-amino-n-caproic acid (hereinafter called EACA) or its molecular compounds with calcium halide inhibit the activation of plasmin or suppress the high activity of plasmin at a low concentraiton of about $2 \times 10^{-6}$ mol. and that they are satisfactory from the viewpoint of non-toxicity, and that EACA is useful in treating diseases associated with and/or caused by plasmin activation in vivo. The inventors of the mentioned invention and their medical associates have made various investigations either experimentally or clinically as to the pathologic significance of plasmin system in the living organism, and have found out many grounds that plasmin in the blood and/or in the tissues is activated (1) in the case of acute exudative skin diseases suspected to be allergic such as acute eczema, dermatitis and urticaria, and (2) in the case of bleeding such as gum-bleeding, spot-like hypodermatic bleeding appearing in leukemia or a plastic anemia, uterus bleeding caused by the disfunction of uterus and some other types of hemorrhage. Such phenomena as the activation of plasmin in the blood was naturally found in the case of introducing streptokinase preparation and human serum to animals. Furthermore, when EACA was applied to patients suffering from the above-mentioned diseases, in whom plasmin activity is distinctly high in the circulatory blood, activation and/or activity of plasmin in the blood were obviously suppressed and the clinical signs such as bleeding or exudation were remarkably improved. The utility of the clinical application of EACA to patients of the above mentioned kinds was repeatedly confirmed by conducting examinations on a number of patients and also by appropriate controls proving the effectiveness of the clinical application of EACA (S. Okamoto, The Keio Journal of Medicine, vol. 8, No. 4, p. 211 (1959); K. Yokoyama and H. Hatano, ibid, p. 303, K. Nakajima and S. Sato, ibid. p. 267, I. Mikata and T. Igarashi ibid. p. 319, I. Mikata and T. Igarashi, ibid. p. 279). Besides, the results mentioned therein indicate that a non-toxic substance, having a potent inhibitory action on the plasmin system in vitro tests as well as in animal experiments, may also exert an inhibitory action on the plasmin system of patients when administered, and that the administration of such an active ingredient may improve such clinical signs as exudation or bleeding in patients that are associated with and/or caused by plasmin activation.

This tempted the inventors of the present invention to further investigation looking for a more potent synthetic antiplasminic substance than EACA. As a result of the investigation conducted either chemically or physiologically, the inventors have found a chemical substance which has a more potent inhibitory action on plasmin activation and/or activity of plasmin that EACA, and which is satisfactory from the viewpoint of non-toxicity and of pharmaceutical technique.

One object of the present invention is to provide a drug composition for inhibiting the activation of plasmin and/or suppressing the high activity of plasmin in vitro and in vivo, in which 4-(aminomethyl)-cyclohexane-1-carboxylic acid (hereinafter called AMCHA), especially the trans stereo isomer thereof (hereinafter called trans-AMCHA) is used as an active ingredient. Another object is to provide a method for inhibiting the activation of plasmin and/or suppressing the high activity of plasmin in vitro and in vivo, especially in patients by application of AMCHA or trans-AMCHA as an active ingredient. According to the present invention, AMCHA or trans-AMCHA the active ingredient, may be admixed with some kinds of carriers or diluents which are generally used in pharmaceutical technique. The compositions may take the form of tablets, powders, capsules, or other dosage forms which are particularly useful for oral ingestion; liquid diluents are employed in sterile condition for parenteral uses such as injection. Furthermore, the active ingredient can be used together with other active ingredient used for pharmaceuticals. The compositions may take the form of active material, namely, active ingredients thereof, admixed with solid diluents and/or tableting adjuvants such as cornstarch, lactose, talc, stearic acid, magnesium stearate, gums, chocolate and/or the like. Any tableting materials used in pharmaceutical practice may be employed if not incompatible with said active ingredients. The material may be made into tablets with or without adjuvants. Alternatively the active ingredient with its adjuvant material may be placed in the usual capsule or resorbable material such as the usual gelation capsule and administered in that form. In another embodiment, the composition may be put up in powder packets, or may be prepared in the form of suspension in a material in which the active ingredient is not soluble. Or the active ingredient may be employed as ointment by admixing any ointment used in pharmaceutical practice, for example, oil-in-water type or water-in-oil type cream.

AMCHA is prepared by a catalytic reduction of p-aminomethyl benzoic acid or p-cyano benzoic acid in the presence of platinum oxide. AMCHA is also prepared by the reduction of p-aminomethyl benzoic acid hydrochloride with metallic sodium in amyl alcohol.

AMCHA that has the formula

is colorless powder having the melting point of 237–238° C. (decomposition), and has two stereo isomers, that is trans- and cis-isomers.

Trans-AMCHA, which has the stereo conformation

is colorless powder having the melting point of 380–390° C. (decomp. uncorrect. in air bath) and has characteristic infra-red absorptions at 1637, 1535, and 1383 cm.$^{-1}$ The salts of trans-AMCHA have the following melting points.

HCl salt: [$C_8H_{15}NO_2 \cdot HCl$] 238–240° C. (decomp.)
Au salt: [$C_8H_{15}NO_2 \cdot HCl \cdot AuCl_3$] 204–206° C. (decomp.)
Pt salt: [($C_8H_{15}NO_2 \cdot HCl$)$_2 PtCl_4$] 254–255° C. (decomp.)

Cis-isomer (hereinafter called cis-AMCHA) which has the stereo conformation

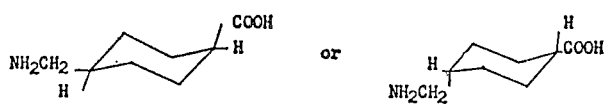

powder having the melting point of 238–242° C. (decomp.) and has characteristic infrared absorptions at 1640, 1565, 1515, 1415 and 1310 cm.$^{-1}$.

Thans-AMCHA is soluble in six volume of water at room temperature but insoluble in methanol. Furthermore, hydrochloric salts of cis-AMCHA are more soluble in methanol than those of trans-AMCHA.

As only cis-AMCHA forms water-insoluble copper salt thereof by heating with aqueous dispersion of copper salt such as copper carbonate or copper hydroxide, the separation of trans-AMCHA from AMCHA (a mixture of cis- and trans-AMCHA) can be accomplished by this method. In general, AMCHA prepared by the abovementioned methods contains trans-AMCHA and cis-AMCHA in the ratio of about 5±5:6±5.

AMCHA prepared by any of the above-mentioned processes is refluxed for 1–2 hrs. in water with, for example, copper carbonate, whereby copper salt of cis-AMCHA is formed. As a copper salt, copper hydroxide, copper acetate, copper sulfate or copper phosphate can be also used. The solution obtained by filtration of the precipitate of copper salt of cis-AMCHA is passed through a column of ion exchange resin for removing a trace of inorganic ions and is concentrated under vacuum. The residue is recrystallized with a mixture of water and acetone, whereby the crystals of trans-AMCHA are obtained. The precipitate of copper salt of cis-AMCHA is dissolved in aqueous ammonia solution, the solution is passed through a column of cation exchange resin for removing copper ion and then is concentrated under vacuum, the residue being recrystallized with a mixture of water and acetone, whereby the crystals of cis-AMCHA are obtained.

To confirm the stereo conformation of both isomers, the spectra of nuclear magnetic resonance absorption are taken from heavy water solution of samples by using dioxane as internal standard material at room temperature. In this spectrum, trans-AMCHA shows sharp doublet signals at 51 and 56 c.p.s. on the higher magnetic field side than that of dioxane, which are signals of methylene group of aminomethyl group, a broad signal having about 30 c.p.s. of half value wide at about 95 c.p.s., which is considered a signal of hydrogen atom bound to carbon atom binding the carboxy group because it transferred by about 10 c.p.s. to lower magnetic field side by the addition of hydrochloric acid, and a broad signal having about 60 c.p.s. of half-value side at about 130 c.p.s. which is a signal of ring methylene group. Cis-AMCHA shows sharp doublet signals at 45 and 51 c.p.s. on the higher magnetic field side than that of dioxane which are signals of methylene group of aminomethyl group, broad signal having about 15 c.p.s. of half-value wide at about 85 c.p.s which is considered a signal of hydrogen atom bound to carbon atom binding carboxy group from the view point that it is transferred by about 20 c.p.s. to the lower magnetic field side by the addition of hydrochloric acid, and a broad signal having about 25 c.p.s. of half-value wide at about 130 c.p.s., which is a signal of ring methylene group.

In comparison between the spectra of both isomers, the signals of ring methylene group of trans-AMCHA has twice half-valve wide as that cis-AMCHA. And the signal of hydrogen atom bound to carbon atom binding carboxy group of trans-AMCHA mentioned above exists on the higher magnetic field side and has broader half-value wide than that of cis-AMCHA mentioned above. Accordingly, the hydrogen atom is supported to be bound axially to cyclohexane ring of trans-AMCHA mentioned above.

It is concluded that trans-AMCHA mentioned above is truly trans-isomer of AMCHA by the following reasons.

is colorless (1) The melting point of trans-AMCHA is higher than that of cis-AMCHA.

(2) In the nuclear magnetic resonance spectra, the signal of ring methylene group of trans-AMCHA has twice half-value wide as that of cis-AMCHA.

(3) The signal of hydrogen atom bound to carbon atom binding carboxy group of trans-AMCHA exists on the higher magnetic field side, and has broader half-value wide than that of cis-AMCHA.

(4) The infra-red spectrum of trans-AMCHA is simpler than that of cis-AMCHA.

In order to examine the action of the active ingredients, AMCHA or trans-AMCHA, the fibrinolytic system which contains spontaneously activated plasmin obtained from horse serum or human serum was used and the measurement of antiplasminic power was made by admixing the above-mentioned plasmin fraction with fibrinogen separated from rabbit plasma, adding to the mixture a certain quantity of substances which had been diluted, forming fibrin clots by adding thrombin to the above mixture, and then by measuring the time required for the complete dissolution of the fibrin clots incubated at 38° C., and comparing the said time with that of the dissolution of control fibrin clots to which the substance to be measured had not been added. Thus, the power of inhibiting the activity of plasmin per se was demonstrated at a very low concentration of AMCHA or of trans-AMCHA, i.e., at 10 times or 40 times dilution respectively of the final effective concentration of EACA.

Another examination of the action of AMCHA on the activation process of the plasmin system in vitro was conducted by the streptokinase-activation test of serum. 0.1 ml. of fresh human serum, a 0.4 ml. of $\frac{1}{20}$ mol phosphate buffer saline solution and a 0.1 ml. saline solution containing 100 units of streptokinase were mixed together in a small test tube which placed in the ice water bath. After five minutes, 0.05 ml. of a saline solution containing 5 units of thrombin and 0.3 ml. of a 0.33% bovine fibrinogen solution were added to the test tube. Then the mixture was incubated at 25° C. and the time required for the complete lysis of the formed clots was measured. The results thus obtained presented the control value. Next, the inhibitory action of AMCHA was observed by dissolving it in the above-mentioned buffer solution; and the relations between the retardation of the lysis time and the concentration of AMCHA were inquired into and compared with EACA. The results are indicated in the following Table I.

However, antiplasminic action of cis-AMCHA examined by the fibrin clot lysis time was slight. Results obtained by the fibrin plate method after Astrup showed comparative figures of the antiplasminic activity of trans-AMCHA and cis-AMCHA respectively. For example, products of the perpendicular diameters of the fibrin lysed area expressed in mm.$^2$ are 178 without active ingredient, but 0 with trans-AMCHA and 74 with cis-AMCHA when 3 units of streptokinase was added on fibrin plates contains each active ingredient in the concentration of 0.1 mg./ml. and sufficient euglobulin fraction of human serum.

Results obtained from these kinds of experiments indicate that antiplasminic activity of cis-AMCHA is weak and the antiplasminic activity of AMCHA largely depends on trans-AMCHA contained in it.

The more potent antiplasminic action of trans-AMCHA than that of AMCHA is never decreased at all even after TABLE I.—LYSIS TIME REQUIRED FOR THE COMPLETE DISSOLUTION OF FIBRIN CLOTS IN THE STREPTOKINASE-ACTIVATION TEST OF PLASMIN WITH VARIOUS CONCENTRATIONS OF AMCHA OR EACA

| | [1. Human Serum (Standard serum sample)] Lysis time | | | | | | | | | |
|---|---|---|---|---|---|---|---|---|---|---|
| | Final concentration (g./ml.)[1] | | | | | | | | | |
| Active ingredients | $10^{-\infty}$ (Control) | $10^{-11}$ | $10^{-10}$ | $10^{-9}$ | $10^{-8}$ | $6 \times 10^{-8}$ | $3 \times 10^{-7}$ | $1.6 \times 10^{-6}$ | $8 \times 10^{-6}$ | $4 \times 10^{-5}$ |
| AMCHA, sec | 652 | 600 | 641 | 728 | 955 | 1,230 | 1,350 | 2,205 | 3,600 | 3,600 |
| EACA, sec | 660 | | | | | 660 | 890 | 810 | 1,642 | 3,600 |

[1] Final concentration of active ingredients in the reaction mixture (g./ml.).

The results shown in Table I indicate (1) that the lowest concentration of AMCHA in the reaction mixture required for causing a distinct retardation of the lysis time of the fibrin clots was $10^{-9}$ g./ml., namely c.a. $6 \times 10^{-9}$ mol, while that of EACA was $3 \times 10^{-7}$ g./ml. and (2) that the concentration of AMCHA required for doubling the control lysis time was about $3 \times 10^{-7}$ g./ml., namely c.a. $2 \times 10^{-6}$ mol, while that of EACA was about $8 \times 10^{-6}$ g./ml.

The above-mentioned results also indicate that, when examined in vitro, the inhibitory action of AMCHA on the streptokinase-activation-process of the plasmin system of human serum is evidently very potent, that is, more than ten times as potent as the action of EACA.

In order to compare the activity of trans-AMCHA with that of AMCHA, the same process was taken. The results obtained are shown in Table II.

As shown in Table II, the lowest concentration of trans-AMCHA in the reaction mixture, required for causing a distinct retardation of the lysis time of the fibrin clot, was $5 \times 10^{-10}$ g./ml., namely about $3 \times 10^{-9}$ mol, although that of AMCHA was $10^{-8}$ g./ml., namely about $6 \times 10^{-8}$ mol. The concentration of trans-AMCHA, required for doubling the control lysis time, was $10^{-8}$ g./ml., namely about $6 \times 10^{-8}$ mol, although that of AMCHA was $5 \times 10^{-8}$ g./ml. Thus, the inhibitory action of trans-AMCHA is more than 5 times as potent as that of AMCHA.

the prolonged incubation for 150 minutes with human serum at 37° C. This indicates a reliable stability of the action of trans-AMCHA under the influence of human serum in vitro.

As to the action of AMCHA on the plasmin system in vivo, the following experiments were made. In the experiments shown in Table III, 250 mg., 100 mg. and 25 mg. of AMCHA or EACA were respectively administered by intravenous injection to rabbits. Blood samples were then drawn by puncture at the times mentioned in Table III and the actions of AMCHA or EACA were measured by the streptokinase-activation plasmin test.

TABLE II

| | Lysi time | | | | | | | | | |
|---|---|---|---|---|---|---|---|---|---|---|
| | Final concentration (g./ml.) | | | | | | | | | |
| Active ingredient | Control | $2 \times 10^{-10}$ | $5 \times 10^{-10}$ | $10^{-9}$ | $10^{-8}$ | $2.5 \times 10^{-8}$ | $10^{-8}$ | $10^{-7}$ | $2.6 \times 10^{-7}$ | $5 \times 10^{-}$ |
| Trans-AMCHA, sec | 310 | 330 | 400 | 470 | 570 | 830 | 990 | 1,440 | >3,600 | >3,600 |
| AMCHA, sec | 330 | 330 | 330 | 350 | 410 | 500 | 650 | 880 | 1,620 | >3,600 |

TABLE III.—LYSIS TIME REQUIRED FOR THE COMPLETE DISSOLUTION OF THE FIBRIN CLOT IN THE STREPTOKINASE ACTIVATION TEST ON PLASMIN OF THE CIRCULATORY BLOOD

| | Lysis time | | | |
|---|---|---|---|---|
| | | Time course | | |
| Active ingredient Name, amount | Control, sec. | After 1-2 hrs., sec. | After 3-4 hrs., sec. | After 5-6 hrs., sec. |
| AMCHA, 250 mg | 1,320 | >2,400 | >2,400 | >2,400 |
| EACA, 250 mg | 1,200 | >2,400 | >2,400 | >2,400 |
| AMCHA, 100 mg | 1,080 | >3,600 | | 1,926 |
| EACA, 100 mg | 900 | 1,950 | | 1,884 |
| AMCHA, 25 mg | 1,986 | >3,600 | >3,600 | 2,592 |
| EACA, 25 mg | 1,992 | 2,586 | 2,424 | 2,166 |

The results in Table III are summarized as follows:

(1) The intravenous administration of 250 mg. of AMCHA or EACA solved in a saline solution, produced a very marked retardation of lysis time from one hour to six hours after the injection of said active ingredients, indicating that AMCHA and EACA exerted strong inhibitory action of the same order on the plasmin system in vivo when such large amounts as 250 mg. were administered to rabbits.

(2) The action of AMCHA, however, was different from that of EACA when 100 mg. and 25 mg. of these active ingredients were administered by intravenous injection to rabbits. The intravenous administration of 25 mg. or 100 mg. of AMCHA produced a marked retardation of lysis time, while that of EACA was obviously rapid in lysis time than AMCHA, indicating that AMCHA exerted a stronger action than EACA on the plasmin system in vivo when such an amount as 25 mg. was administered to rabbits.

Next, other experiments in rabbits comparing the action of small amount of trans-AMCHA with that of AMCHA demonstrate the superiority of the action of trans-AMCHA in vivo. 25 mg. of trans-AMCHA was intravenously administered to rabbits and the antiplasminic action of blood samples taken at regular intervals was compared. As seen in Table IV, results obtained indicate that the antiplasminic action of trans-AMCHA is far more surpassing than that of AMCHA in every blood sample taken from 2 hrs. to 5 hrs. after the intravenous administration.

TABLE IV

| Active ingredient | Control | After 1 hour | After 2 hours | After 3 hours | After 4 hours | After 5 hours |
|---|---|---|---|---|---|---|
| | | | Lysis time | | | |
| | | | Time course | | | |
| AMCHA, sec. | 660 | >7,200 | 1,260 | 900 | 780 | 720 |
| Trans-AMCHA, sec. | 960 | >7,200 | >7,200 | 2,460 | 1,350 | 1,200 |

As to the clinical dosage of AMCHA or trans-AMCHA, the following conclusion can be deduced from the results shown in Tables II, III, and IV.

In the patients weighing about 50 kg., a single intravenous administration of AMCHA of 500 mg. or trans-AMCHA of 100 mg. is expected to arrest the fibrinolysis of the blood. It can be said, at the same time, that the action of trans-AMCHA is more potent than AMCHA when the same dose of both ingredients are given to patients. Another experiment was made by giving subcutaneously 10 cc. of a 10% aqueous solution of AMCHA to a rabbit weighing 2.4 kg. (420 mg. of active ingredients per 1 kg. of the rabbit). The concentration of AMCHA in the blood serum after 30 minutes showed its maximum value, namely 50–60 mg./dl. serum. It decreased gradually with the lapse of time; that is, it decreased to half of the maximum after 3 hours, and to one-tenth after 6 hours. The excretion of the active ingredient of AMCHA in urine was perceived at the rate of 80% after 24 hours.

Furthermore, an experiment was carried out by giving per os 1.0 g. of powder of AMCHA to a rabbit weighing 2.4 kg. AMCHA was recognized in the blood serum 30 minutes after administration; the concentration of AMCHA in the serum showed 20–30 mg./dl. of serum from 30 minutes to 2 hours, decreased gradually to about 3 mg./dl. after 5–6 hours and a little amount remained after 24 hours. In these cases of administrating AMCHA per os, the excretion of AMCHA in urine was perceived in its original form at the rate of about 60% within two days and 10% in the following two days.

The same experiment as mentioned above was made on trans-AMCHA and the results obtained were similar to that of AMCH.

Thus, the results as to the absorption and excretion of AMCHA or trans-AMCHA administered by parenteral or per os indicate that the excretion of AMCHA and trans-AMCHA was fairly rapid, whereby no trouble need to be considered was caused by accumulation of AMCHA or trans-AMCHA in the living body.

The results of the administration of AMCHA or trans-AMCHA per os indicate that the adsorption velocity was very rapid and that high concentration of AMCHA or trans-AMCHA appeared in the blood soon after administration, proving the advantage of the per os administration of AMCHA or trans-AMCHA to patients.

On the other hand, toxicity examination of AMCHA or trans-AMCHA was carried out, and it was made clear that AMCHA and trans-AMCHA of the present invention were not toxic. In all five cases of injecting intravenously a 5% and a 10% aqueous solutions of AMCHA at the rate of 1 g. of AMCHA per 1 kg. of the weight of a mouse, no toxicity was noticed and all mice were living. And in the case of injecting intravenously a 5% aqueous solution of AMCHA at the rate of 40 mg. of AMCHA per 1 kg. of the weight of a rabbit continuously for twelve days, once a day, the rabbits were sacrificed after the lapse of nine days, and the abnormality of organs was examined histo-pathologically.

From the results by using the same method on trans-AMCHA as that on AMCHA, no toxicity was noticed and all the mice were alive. Microscopic observation of the preparations of the cerebrum, cerebellum, hypophysis, heart, lung, liver, pancreas, spleen, kidney, adrenal gland, testicle, ovarium, uterus and mesenteric lymphatic glands, proved that little or no trouble was produced by the repeated administration of AMCHA or trans-AMCHA.

The above results suggest that in case of the human body, it is safe to give 50–60 gr. of AMCHA or 20–24 g. of trans-AMCHA per dose, and therefore, as far as dosage is concerned, there is no trouble at all, and that such dose as 50–60 gr. of AMCHA is far larger than 500 mg. of AMCHA or 100 mg. of trans-AMCHA which is effective in suppressing or arresting the activation of the plasmin system in the blood when applied.

The following animal experiments were designed for examining the action of AMCHA to those disorders of living organism which were experimentally produced by the activation of plasmin in blood or in locus.

1. The action of AMCHA upon the bleeding tendency of dog produced with the experimental activation of plasmin in blood.

(A 50 cc. of human serum, which underwent the Castelani's absorption with dog red blood cells, was administered intravenously to the dog, with the expectation that the sensibility of dog blood to streptokinase wound increase to such an extent as 1,000 times. (Originally dog blood has no or slight response to streptokinase.)

(B) On the other hand, skin of the dog was incised 10 cm. long and the wound surface was opened. A filter paper of a certain size and a certain weight was closely placed on the skin surface. After 30 seconds it was taken and the amount of the dipped blood was calculated weighing the filter paper with blood. Thus the amount of bleeding was recorded in each 5 minutes.

(C) Then, saline solution containing 10,000–30,000μ of streptokinase was administered intravenously to the dog, resulting the strong activation of plasmin in blood.

(D) Accompanied with the mentioned activation of plasmin in blood, very marked increase of bleeding was observed to such an extent as several to more than ten times, showing the experimental representation of the "severe bleeding" with action of plasmin (which can happen in patients under surgical operation or delivery. ref. to S. Okamoto. The Keio Journal of Medicine, vol. 8, No. 4, p. 211 (1959)).

(E) The intravenous administration of AMCHA of 100–250 mg. to dogs in those experiments was found to be effective in suppressing the activity of plasmin in blood. At the same time, the increased bleeding tendency observed on the incised wound began to decrease and soon after turned to be nearly normal.

The evidence obtained from here mentioned experiments indicated that the application of AMCHA to those disorders (where plasmin activity in blood was very high and bleeding tendency was also obviously increased) can result in therapeutic effects.

(2) Action of AMCHA on the permeability-increasing of rabbit skin produced with the activation of plasmin.

A solution of trypan blue was first intravenously administered to rabbits. Soon after reaction mixture, made of human plasminogen, streptkinase and fibrinogen, was subcutaneously injected to the shaved skin of rabbits and the diffusion of dye from blood to tissue caused by the injection of the reaction mixture was observed and recorded by color photograph. The appropriate controls were also taken.

Results obtained indicated that the injection of the mentioned reaction mixture resulted the most marked permeability increasing of the dye. When 1–10 mg. of AMCHA was added to the reactor mixture (made of plasminogen, streptokinase and fibrinogen) prior to the subcutaneous injection, the permeability-increasing effect of the mentioned reaction mixture was obviously inhibited, indicating the marked suppressing effect of AMCHA on the permeability-increasing which could be produced by the plasmin system.

The evidence obtained from the mentioned experiments indicate that the application of AMCHA to those disorders (where local permeability is increased and the plasmin system in locus is activated) can result in therapeutic effects.

Clinical results show the indisputable value of the composition of the present invention, which contains synthetic antiplasminic substances, i.e. AMCHA or trans-AMCHA, as an example of substances for combatting the action of the pathologic proteolytic enzyme, i.e. plasmin.

The compositions in accordance with the present invention have been found to be remarkably effective against acute exudative skin diseases.

The composition of active ingredients of the present invention is used generally by following the application method.

In case AMCHA or trans-AMCHA used as injection, a sterile parenteral solution, containing 0.1–25%, more preferably 2–20% concentration of AMCHA or trans-AMCHA is suitable for subcutaneous, intramuscular and intravenous injection. For subcutaneous injection, a 2–5 cc. of a 5% solution of AMCHA or trans-AMCHA is used each time. For intramuscular injection a 2–5 cc. of a 1–10% solution, preferably a 5% solution of AMCHA or trans-AMCHA, is used, and, for intravenous injection, a 2–20% solution, preferably 5 cc. of a 5% solution of AMCHA or trans-AMCHA, or 2–3 cc. of a 10% solution of AMCHA or trans-AMCHA is used. The solution of any intermediate concentration is also good. The use of 1–5 gm. per day of AMCHA or trans-AMCHA is orally administered, 0.1–2 gm., preferably 0.5–1 gm. will be given at one time. When tablets, powders, capsules or other dosage forms are used, a significant amount of solid material which is pharmaceutically adopted as carrier will be admixed with the active ingredients, substantially more than 0.01% by weight. AMCHA or trans-AMCHA can be applied topically as ointment against skin diseases, then a satisfactory result will be obtained. In this case, 0.1–10%, preferably 2–5%, of AMCHA or trans-AMCHA in the ointment is used. As ointment base, emulsion-ointment generally used pharmaceutically, more especially, oil-in-water type and water-in-oil emulsion ointments can be used. A better result can be obtained by the concurrent use, as topical application and intravenous injection, of the active ingredients than by the sole use of topical application.

For inhibiting or suppressing the bleeding on incised wounds or injuries, a sterile parenteral solution with 0.1–20%, preferably a 2–5%, concentration of AMCHA or trans-AMCHA can be also used topically in continuous or discontinuous irrigation and/or washing.

Considering that trans-AMCHA has more potent activity than AMCHA, the dosage amount of trans-AMCHA in the ordinal diseases can be reduced to one fifth, preferably to one fourth of that of AMCHA. However, the effective dosage amount varies in a wide range according to the sort of diseases, clinical status, body weight of patient and the method of administration. For example, for the ordinal diseases of adult in case of intravenous or intramuscular injection 0.1–1 g. per day of AMCHA or 0.05–0.25 g. per day of trans-AMCHA is used suitably, and in case of oral administration, 1–5 g. per day of AMCHA or 0.25–1.25 g. per day of trans-AMCHA is used suitably. For the treatment of specific diseases such as essential renal hematuria which needs the administration of a large amount of antiplasminic drug, the oral administration of 1–6 g. of trans-AMCHA is generally needed. Thus, the dosage amounts of AMCHA and trans-AMCHA is concluded as follows from the clinical view point.

The use of 0.01–10.0 g., preferably 0.25–5.0 g. per day of AMCHA, that is 0.2–200 mg., preferably 5–100 mg. per kg. of living body weight per day of AMCHA and the use of 0.01–7.0 g., preferably 0.01–1.25 g. per day of trans-AMCHA, that is 0.2–140 mg., preferably 0.2–25 mg. of trans-AMCHA per kg. of living body weight per day will be effective against many kinds of diseases. The use of more in quantity per day or the consecutive use of every day will cause no toxicity.

Among many examples which show the anti-plasminic effect of AMCHA or trans-AMCHA in the living organism and the utility thereof, a certain number of examples are described hereunder. It must be noted, however, that the effect of the compositions of the present invention is not limited within the above description and the followng examples.

What is claimed is:

1. A method of suppressing the activity of plasmin in vivo comprising introducing an effective amount of trans-4-(aminomethyl)-cyclohexane-1-carboxylic acid into the living body of humans and animals; said trans acid having the melting point of 380–390° C. (decomposed), the characteristic infra-red absorptions at 1637, 1535 and 1383 cm.$^{-1}$ and the following conformation:

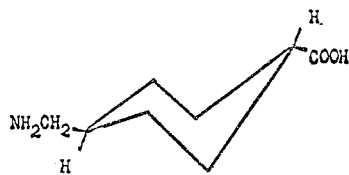

and the melting point of the hydrochloric acid salt thereof [$C_8H_{15}NO_2 \cdot HCl$], the gold salt thereof

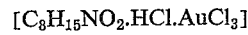

[$C_8H_{15}NO_2 \cdot HCl \cdot AuCl_3$]

and the platinum salt thereof [$(C_8H_{15}NO_2HCl)_2PtCl_4$] being 238–240° C. (decomposed), 204–206° C. (decomposed) and 254–255° C.

2. A method according to claim 1 characterized in that the maximum daily dosage is about 0.2 to about 140 mg./kg.

3. A method according to claim 1 characterized in that said acid is introduced in the amount of 0.01 to 7.0 g. per day.

4. A method according to claim 1 characterized in that said acid is orally introduced and the daily dosage is 0.1 to 2.0 g.

5. A method according to claim 1 wherein said acid is orally introduced in the amount of 0.01 to 1.25 g. per day.

6. A method according to claim 1 wherein said acid is introduced with a pharmaceutical carrier, the amount of said acid being 0.01 to 7.0 grams per day.

References Cited

UNITED STATES PATENTS 3,268,405  8/1966  Nagasawa et al. ..... 424—319

OTHER REFERENCES

Noller, Chemistry of Organic Compounds, W. B. Saunders, Philadelphia, Pa. (1957), pp. 354–356.

ALBERT T. MEYERS, Primary Examiner

V. C. CLARKE, Assistant Examiner